W. A. LORENZ.
HEADLIGHT.
APPLICATION FILED JAN. 2, 1920.

1,376,447.

Patented May 3, 1921.
4 SHEETS—SHEET 1.

Inventor
William A. Lorenz
by Harry R. Williams
Attorney

W. A. LORENZ.
HEADLIGHT.
APPLICATION FILED JAN. 2, 1920.
1,376,447.
Patented May 3, 1921.
4 SHEETS—SHEET 2.
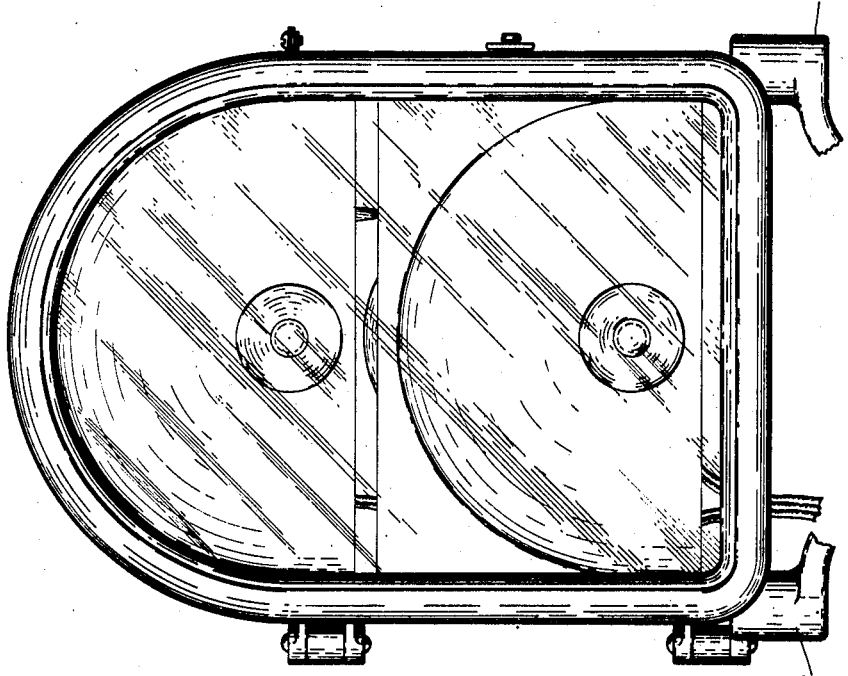
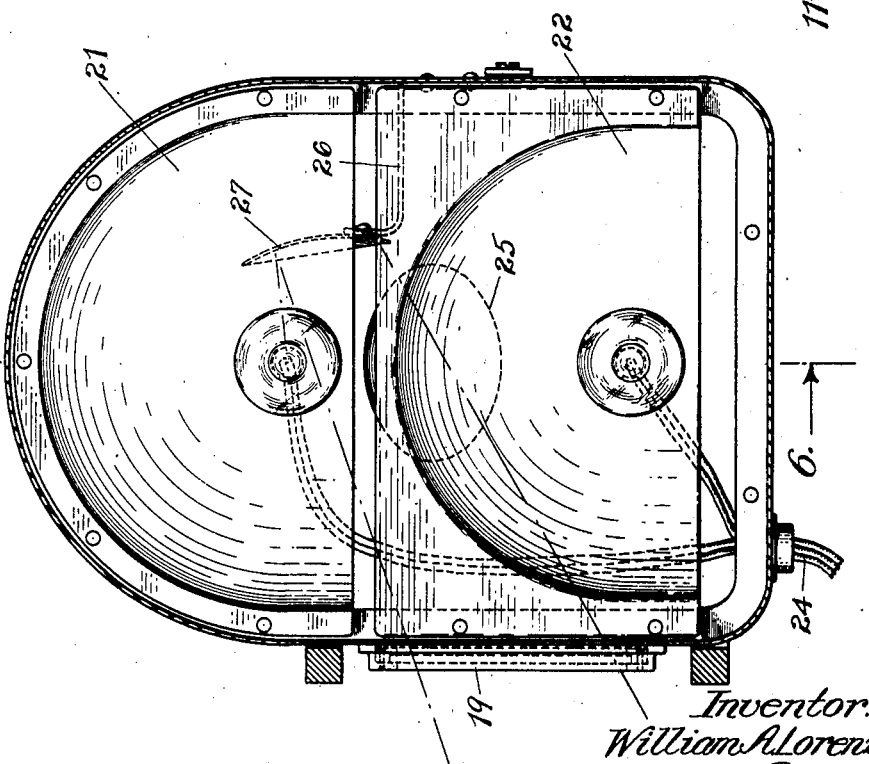
Inventor:
William A. Lorenz.
by Harry P. Williams
Attorney.

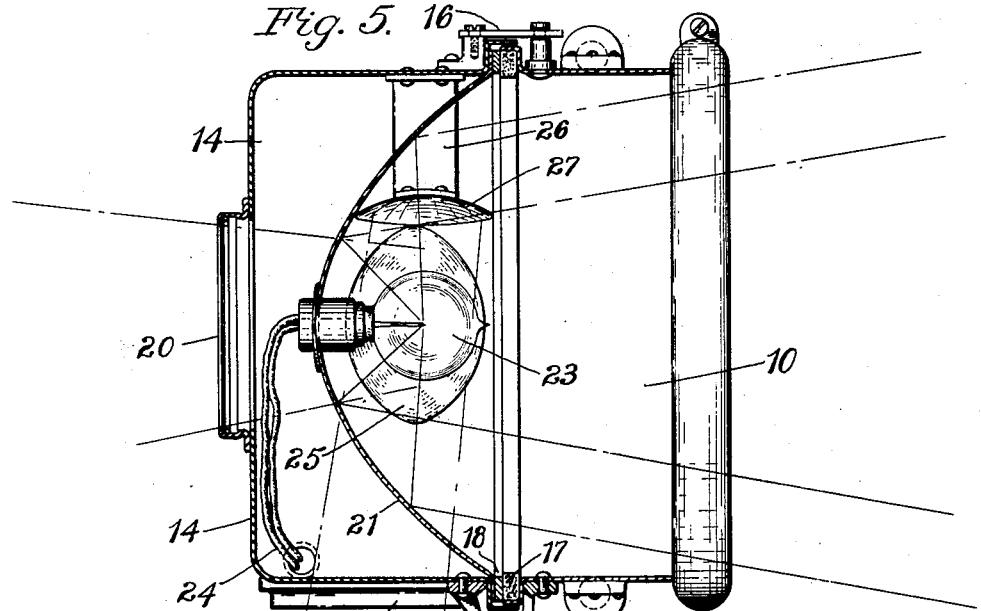
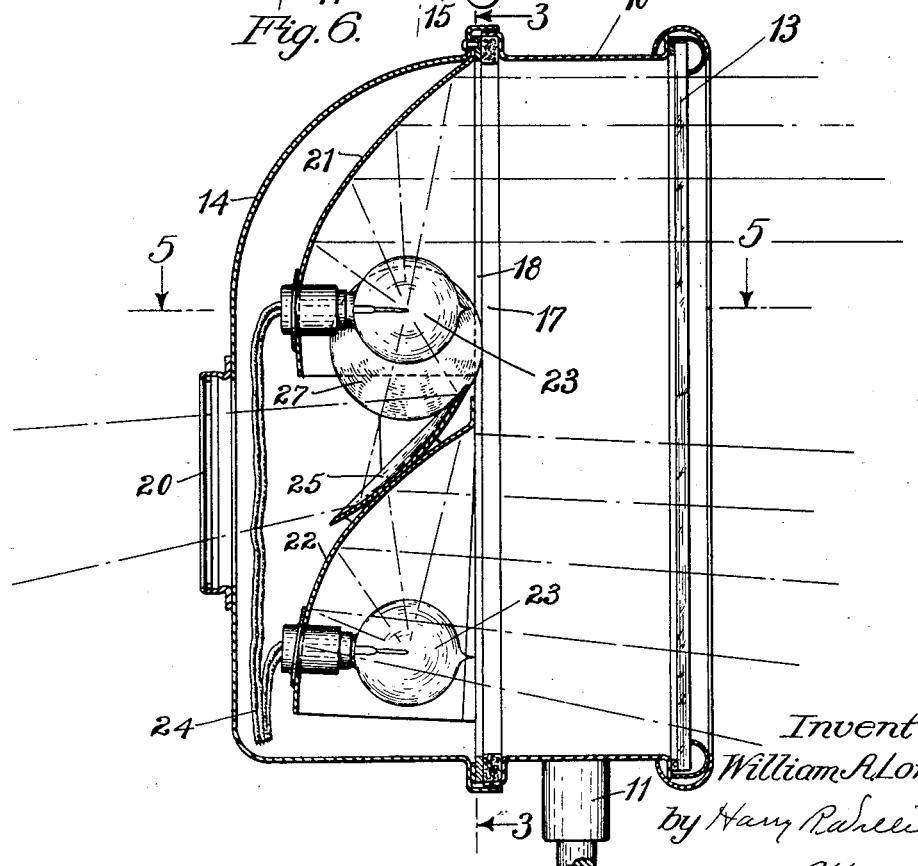

W. A. LORENZ.
HEADLIGHT.
APPLICATION FILED JAN. 2, 1920.

1,376,447.

Patented May 3, 1921.
4 SHEETS—SHEET 4.

Inventor
William A. Lorenz
by Harry R. Williams
Attorney

UNITED STATES PATENT OFFICE.

WILLIAM A. LORENZ, OF HARTFORD, CONNECTICUT.

HEADLIGHT.

1,376,447. Specification of Letters Patent. Patented May 3, 1921.

Application filed January 2, 1920. Serial No. 348,907.

*To all whom it may concern:*

Be it known that I, WILLIAM A. LORENZ, a citizen of the United States, residing at Hartford, in the county of Hartford and State of Connecticut, have invented a new and useful Improvement in Headlights, of which the following is a specification.

This invention relates to the construction of those lamps which are provided for attachment to the fronts of automobiles.

The object of the invention is to so construct such a lamp that a powerful light, the intensity of which may be varied, may be projected upon the roadway close to and at considerable distance away from the front of the vehicle to which it is attached, without throwing a blinding glare upward into the eyes of the driver of an approaching automobile, and which will throw a light laterally so as to illuminate the roadway and objects at the side of the machine and also some rays backward so as to light the running board or step of the vehicle to which it is attached, the parts being so arranged and assembled that without disturbing the front glass the casing may be readily opened for cleaning all the parts and the interior of the casing, replacing a burned-out lamp, or flooding the front part of the automobile with light when it is desired to examine the engine and locate and eliminate any fault that may have developed at night.

These objects may be attained in a unitary structure by forming the casing of a front section that carries the front glass and means for securing the lamp to the vehicle and a rear section that is hinged to the front section and is provided with a side window and a back window, and mounting in the rear hinged section so that they may be swung out from the front section, two electric lamps adapted to be connected with a current source in such manner that either may be switched on or off, and arranging in the rear section adjacent to the lamps two concave reflectors, preferably having a semi-paraboloidal surface, set to project the light rays from the lamps forward and downward but not upward, and concave reflectors arranged to project light rays through the side and back windows.

Figure 1:
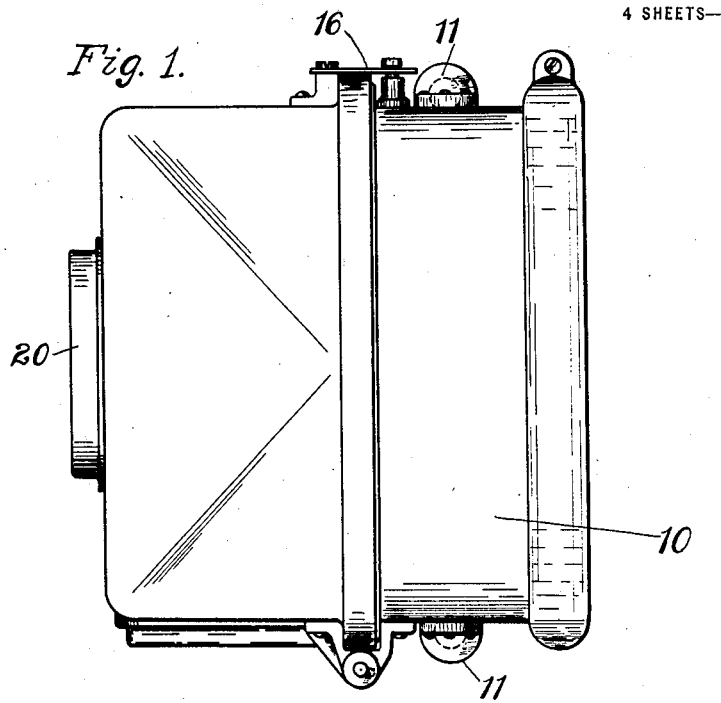
Figure 2:
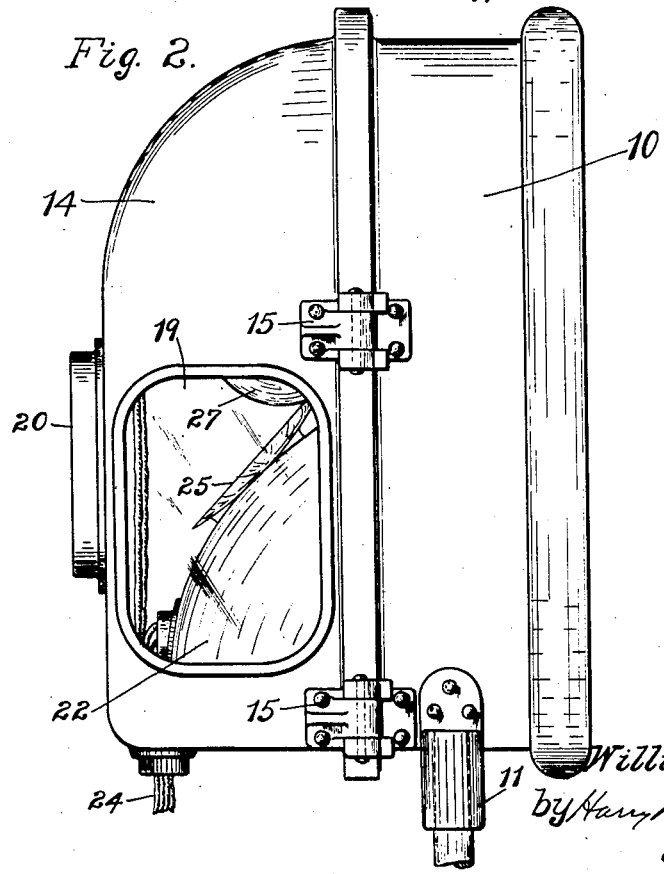
Figure 7:
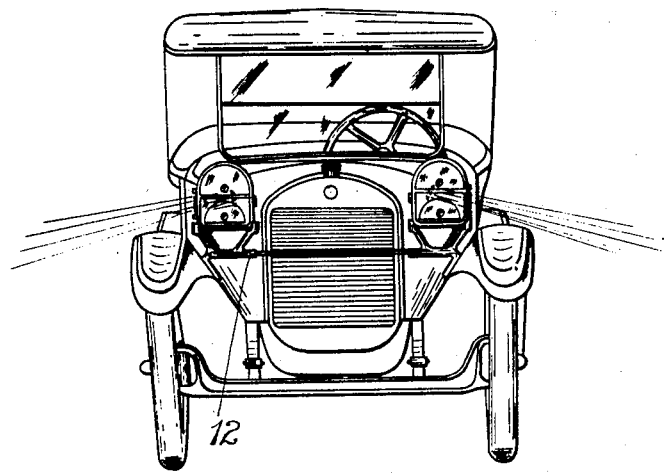
Figure 8:
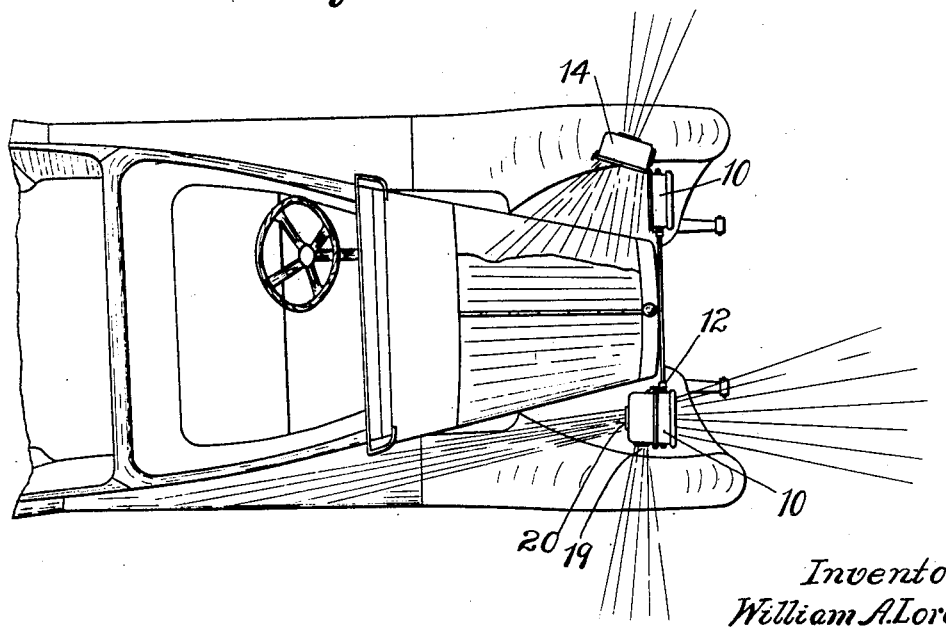

In the accompanying drawings Figure 1 shows a top view of a head light which embodies the invention. Fig. 2 shows a side view of the same. Fig. 3 shows a vertical transverse section on the plane indicated by the dotted line 3—3 on Fig. 6. Fig. 4 shows a front view of the head light. Fig. 5 shows a horizontal section on the plane indicated by the dotted line 5—5 on Fig. 6. Fig. 6 shows a vertical longitudinal section on the plane indicated by the dotted line 6—6 on Fig. 3. Fig. 7 shows a front view of an automobile provided with these head lights. Fig. 8 shows a plan of the front part of the automobile with one of the head lights opened, as when used to throw light upon the engine.

In the form of the invention illustrated in the drawings the front section 10 of the casing is mounted upon brackets 11 that form part of a supporting frame 12 and the front window glass 13 is secured in position by any suitable means. The rear section 14 of the casing is connected with the front section on the outer side by a hinge 15 and on the inner side by a latch 16. A yielding packing washer 17 is located at the edge of one section and a wearing washer 18 is located at the edge of the other section for the purpose of keeping the joint between the sections tight. In the outside wall of the rear section is a window 19 and in the back wall of the rear section is a window 20.

Secured in the upper part of the rear section of the casing is a concave reflector 21 and secured in the lower part of the rear section is a concave reflector 22, these reflectors desirably having semi-paraboloidal surfaces, that is, these reflectors desirably have their surfaces formed on parabolic lines with the lower portions removed. In the focus of each of these reflectors an electric lamp bulb 23 is located, these lamps being adapted to be connected by the usual wiring 24 with the electric current source provided for the machine to which the lamp is attached. It is desirable to have the upper reflector and lamp so arranged that the light rays are projected forward substantially horizontal and to have the lower reflector and lamp arranged so as to project the light rays forward and downward. The adjustment of these reflectors, however, may be made so as to throw the light in any desired way.

Below the upper lamp and conveniently secured to the back of the lower reflector is a small reflector 25 set so as to throw light rays rearwardly through the back window, and arranged on the side of the upper lamp and supported by a bracket 26 secured to the side wall of the rear section of the casing is a small reflector 27 that is set so as to throw light rays laterally through the side window.

The structure thus built may be operated to throw light of the desired intensity downwardly and forwardly on the roadway from either or both of the lamps. It also throws light on the road and objects at the side and backward onto the step of the vehicle to which it is applied. By unfastening the latch and swinging the rear section of the casing outwardly, as illustrated in Fig. 8, the light of the lamps may be thrown onto the front of the automobile and thus utilized for illuminating parts of the engine when desired to inspect the engine if anything goes wrong in the dark. When the casing is thus opened the reflectors and lamps are swung out to such position that the reflectors may be readily polished, the lamps may be changed, and the entire inside of the casing and front window cleaned. With the reflectors arranged in the manner described no glaring light will be reflected upwardly into the eyes of a driver of an approaching automobile, and at the same time light being thrown sidewise, objects such as a person on the side of the road, will be made visible to an approaching automobilist so that such objects or person may be avoided. Furthermore, with this construction clear glass may be used for the front window, obviating the lens constructions and coloring schemes now employed for reducing the blinding glare of headlights

The invention claimed is:—

1. An automobile head light having a sectional casing, the front section being provided with a transparent window and means for permanently fixing the front section to a vehicle, and the rear section being hinged at the outside to the front section and containing an electric lamp and a reflector adjacent to the lamp for projecting light rays forwardly when the sections are closed and projecting light rays onto the engine when the rear section is opened from the front section.

2. An automobile head light having a front section with means for permanently fixing the front section to a vehicle, and having a rear section hinged to the front section and containing an electric lamp and a reflector adjacent to said lamp, said sections being so hinged that the rear section may be swung back and out from the front section to a position which will cause the reflector to throw light rays from the lamp onto the side of the forward portion of the vehicle to which the front section is attached.

3. An automobile head light having a casing with a window in front, a window in back and a window in the outside, an electric lamp mounted in said casing, a reflector in back and above the lamp for throwing light through the front window, a reflector below the lamp for throwing light through the back window, and a reflector at one side of the lamp for throwing light through the outside window.

4. An automobile head light having a casing with a window in front and a window in back, an electric lamp mounted in said casing, a semi-parabolic reflector for throwing light rays forwardly from said lamp through the front window, and a reflector arranged below the semi-parabolic reflector for throwing light rays rearwardly through the back window.

5. An automobile head light having a casing provided with a front, a side and a rear window, a plurality of electric lamps mounted in said casing, a semi-parabolic reflector back and above each of said lamps arranged to throw light rays through the front window, a reflector for throwing light rays through the side window, and a reflector for throwing light rays through the back window.

6. An automobile head light having a front section with a transparent window and means for securing that section to a vehicle, and having a rear section hinged to the front section and provided with side and rear windows, electric lamps mounted in the rear section, a semi-parabolic reflector located in the rear section adjacent to each lamp and adapted to throw light rays therefrom forwardly and downwardly, and reflectors located adjacent to the lamps in the rear section and adapted to throw light rays laterally and rearwardly.

7. An automobile head light having a front casing section, a rear casing section hinged to the front section, two electric lamps mounted in the rear section, a semi-parabolic reflector located above and back of each of said lamps and adapted to throw light rays forwardly and downwardly, and a reflector mounted on one of said semi-parabolic reflectors for throwing light rays rearwardly.

8. An automobile head light having a casing with a front window, a back window and a side window, two electric lamps located one above the other in said casing, a semi-parabolic reflector extending back and above the upper lamp for throwing light forward, a semi-parabolic reflector extending back and above the lower lamp for throwing light downward, a reflector located edgewise within the first mentioned semi-parabolic reflector for throwing light sidewise, and a reflector mounted on the back of the second mentioned semi-parabolic reflector for throwing light rearward.

WILLIAM A. LORENZ.